United States Patent
Shi et al.

(10) Patent No.: US 9,621,212 B2
(45) Date of Patent: Apr. 11, 2017

(54) APPARATUS FOR INTELLIGENTLY REDUCING A SPECIFIC ABSORBTION RATE, A PROTECTIVE CASE AND A TERMINAL

(71) Applicant: Huizhou TCL Mobile Communication Co., Ltd, Huizhou, Guangdong (CN)

(72) Inventors: Xiaoxin Shi, Guangdong (CN); Shengjie Xu, Guangdong (CN); Kunlun Li, Guangdong (CN); Wei Ma, Guangdong (CN); Xuelong Ronald Hu, Guangdong (CN); Vittorio Di Mauro, Guangdong (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 0 days.

(21) Appl. No.: 14/708,721

(22) Filed: May 11, 2015

(65) Prior Publication Data
US 2016/0142089 A1    May 19, 2016

(30) Foreign Application Priority Data

Nov. 28, 2014   (CN) .................... 2014 2 0741144 U

(51) Int. Cl.
| | |
|---|---|
| H01Q 1/24 | (2006.01) |
| H04B 1/3827 | (2015.01) |
| H04B 1/3888 | (2015.01) |
| G06F 1/32 | (2006.01) |
| H04B 7/155 | (2006.01) |
| A45C 11/00 | (2006.01) |

(52) U.S. Cl.
CPC ........... *H04B 1/3838* (2013.01); *G06F 1/325* (2013.01); *G06F 1/3231* (2013.01); *H01Q 1/243* (2013.01); *H01Q 1/245* (2013.01); *H04B 1/3888* (2013.01); *A45C 2011/002* (2013.01); *A45C 2011/003* (2013.01); *H04B 7/15535* (2013.01); *Y02B 60/1289* (2013.01)

(58) Field of Classification Search
CPC .... H04B 1/3838; H04B 17/12; H04B 1/3888; H04B 7/15535; H01Q 1/243; H01Q 1/245; G06F 1/325; G06F 1/3231; A45C 2011/003; A45C 2011/002; Y02B 60/1289
USPC ............................................... 455/575.5, 522
See application file for complete search history.

(56) References Cited

U.S. PATENT DOCUMENTS

| | | | | |
|---|---|---|---|---|
| 8,886,247 | B1* | 11/2014 | Price ................... | H04B 1/3838 370/318 |
| 2010/0277377 | A1* | 11/2010 | Sato ....................... | H01Q 1/243 343/702 |

(Continued)

*Primary Examiner* — Raymond Dean
(74) *Attorney, Agent, or Firm* — Klein, O'Neill & Singh, LLP

(57) ABSTRACT

The present disclosure relates to an apparatus for intelligently reducing a specific absorption rate, a protective case and a terminal. The apparatus includes an antenna assembly, a sensing assembly being configured to determine an approach to or a contact of the antenna assembly by a human body; the sensing assembly is also configured to control the antenna assembly for reduction of input power when detecting an approach to or a contact by a human body. By the above means, the apparatus is capable of lowering the input power automatically when the antenna is approached to the human body, therefore reducing the radiation to the human body and reducing the harm thereto.

17 Claims, 5 Drawing Sheets

(56) References Cited

U.S. PATENT DOCUMENTS

| | | |
|---|---|---|
| 2012/0257657 A1 | 10/2012 | Subrahmanya et al. |
| 2012/0268879 A1* | 10/2012 | Kim .................... H04M 1/0277 |
| | | 361/679.09 |
| 2013/0045697 A1 | 2/2013 | Cheng |
| 2013/0149957 A1 | 6/2013 | Desclos et al. |
| 2014/0071022 A1 | 3/2014 | Na |
| 2014/0129385 A1* | 5/2014 | Anderson ............. H04L 12/145 |
| | | 705/26.41 |
| 2015/0097740 A1* | 4/2015 | Sun ........................ H04B 17/12 |
| | | 343/703 |

* cited by examiner

APPARATUS FOR INTELLIGENTLY REDUCING A SPECIFIC ABSORBTION RATE, A PROTECTIVE CASE AND A TERMINAL

CROSS-REFERENCE TO RELATED APPLICATIONS

This application claims all benefits accruing under 35 U.S.C. §119 from China Patent Application No. 2014207411448, filed on Nov. 28, 2014 in the China Intellectual Property Office, the disclosure of which is incorporated herein by reference. This application is related to a commonly-assigned application entitled, "A Multifunctional Protective Case With Wireless Router Functionality" filed May 7, 2015, U.S. patent application Ser. No. 14/706,483; "A Protective Case for a Tablet Computer" filed May 7, 2015, U.S. patent application Ser. No. 14/706,413.

FIELD

The subject matter herein generally relates to a mobile communication field, in particular to an apparatus for intelligently reducing a specific absorption rate, a protective case and a terminal.

BACKGROUND

SAR is the acronym of "Specific Absorption Rate" which refers to the absorption ratio or absorption rate of the electromagnetic wave. It is the absorption ratio of the electromagnetic wave energy emitted by cellphones or wireless devices. It is defined as that the human body will generate an induced internal electromagnetic field in the function of an external electromagnetic field, thus the international science community utilizes a "SAR" value to quantify and measure the radiation emitted from cellphones.

With the development of mobile communication, the hand-held mobile terminal is getting closer to people's lives. People are using mobile terminals, for instance, cellphones or tablet computers more frequently and for longer terms.

Due to the rise of various mobile terminals, an antenna assembly becomes an essential assembly for realizing the date exchange between a terminal and another terminal or a terminal and a base station, staying around the mobile terminals at a near distance for long term use is bound to harm the human body.

BRIEF DESCRIPTION OF THE DRAWINGS

Implementations of the present technology will now be described, by way of example only, with reference to the attached figures, wherein.

DETAILED DESCRIPTION

Figure 1:
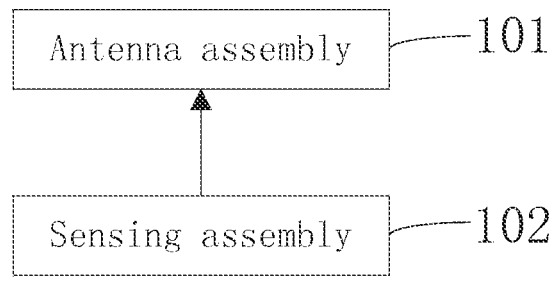
FIG. 1 is a schematic diagram of one embodiment of an apparatus for intelligently reducing a specific absorption rate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "comprising," when utilized, means "including, but not necessarily limited to"; it specifically indicates open-ended inclusion or membership in the so-described combination, group, series and the like.

The present disclosure is described in relation to an apparatus for intelligently reducing a specific absorption rate, a protective case and a terminal.

FIG. 1 illustrates a schematic diagram of one embodiment of an apparatus for intelligently reducing a specific absorption rate, the apparatus comprises an antenna assembly 101 and a sensing assembly 102. The sensing assembly 102 can be configured for detecting an approach to or a contact of the antenna assembly 101 by a human body and controlling the sensing assembly 101 to lower the input power when detecting the approach to or the contact of the sensing assembly 101 by the human body.

The antenna assembly 101 can be a built-in antenna in a mobile terminal, for instance, a radio-frequency emission apparatus in a cellphone, and can also be an external antenna receiving and transmitting signals, for instance, a router or a network switch.

The sensing assembly 102 is generally set close to the antenna assembly 101, and has a similar size with the antenna assembly 101 or a device integrating the antenna assembly 101, in order to facilitate the detection of the approach to or the contact of the exteriors of the sensing assembly by the human body.

For instance a cellphone, in most cases, the cellphone emits the most intense radiation when people are talking on the phone, and their faces are near to the cellphone. Thus more than one sensor or the sensing assembly by a similar area of the contacting surface can be provided along the cellphone surface close to the faces, and the sensing assembly will then control the built-in antenna in the cellphone to lower the input power when detecting the approach to or the contact of the cellphone by the face.

Figure 2:
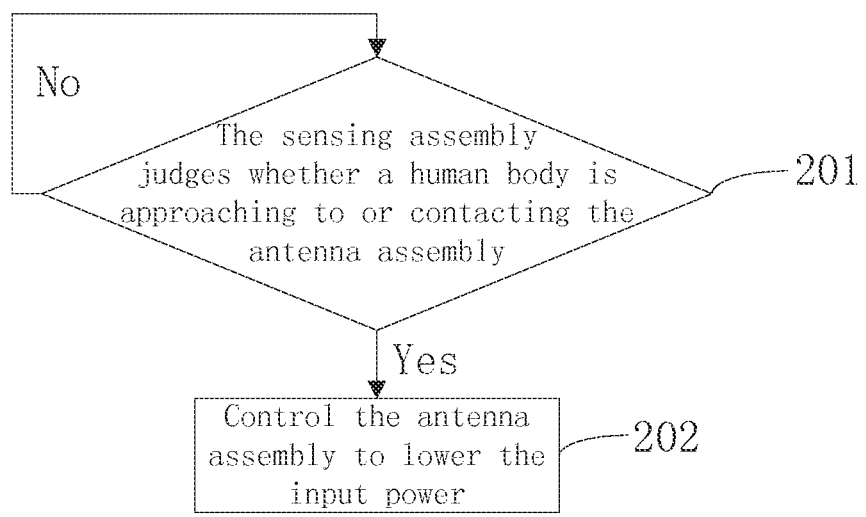
FIG. 2 is a flow chart of one embodiment of the apparatus for intelligently reducing a specific absorption rate.

Referring to FIG. 2, a flowchart is presented in accordance with one embodiment of the apparatus. The method is provided by way of example, as there are a variety of ways to carry out the method. The method described below can be carried out using the configurations illustrated in FIGS. 1 and 3-7, for example, and various elements of these figures are referenced in explaining method. Each block shown in FIG. 2 represents one or more processes, methods or subroutines, carried out in the method. The exemplary method can begin at block 201.

Block 201: judging whether the human body is approaching to or contacting the antenna assembly by the sensing assembly; If positive, directing to step 202; if negative, continuing with step 201;

Block 202: controlling the antenna assembly to lower the input power by the sensing assembly.

Differing from the prior art, the sensing assembly of one embodiment can detect the approach to or the contact of the antenna assembly by the human body, and control the antenna assembly to lower the input power when the human body is approaching to or contacting the antenna assembly. The sensing assembly is capable of controlling the antenna's input power according to the distance between the human body and the antenna, which means the sensing assembly can maintain the original input power when the human body is not closed to or contacting the antenna assembly, and lower the input power when the human body is close to or contacting the antenna assembly. Compared with prior antennas which always maintain the same input power, the sensing assembly in present embodiment can lower the input power when the human body is close to or contacting the antenna assembly, thus reducing the radiation to the human body and reducing the harm thereto, while at the same time ensuring a stable signal.

Figure 3:
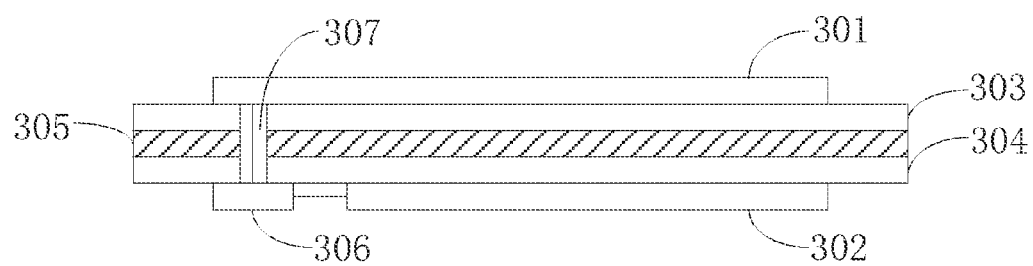
FIG. 3 is a schematic diagram of one embodiment of an apparatus for intelligently reducing a specific absorption rate.

FIG. 3 illustrates a schematic diagram of one embodiment of an apparatus for intelligently reducing a specific absorption rate, wherein the apparatus comprises an antenna assembly 301, a sensor 302 and a sensing chip 306.

The antenna assembly 301 is provided on a first circuit board 303. The sensor 302 and the sensing chip 306 are applied on a second circuit board 304. The first circuit board 303 is overlapped by the second circuit board 304. These two circuit boards are separated by a base material 305.

The first circuit board 303 and the second circuit board 304 are usually printed circuit boards, or can be flexible printed circuit boards in particular circumstances, for instance, when the apparatus is located in a comparatively soft protective case for a mobile terminal, flexible printed circuit boards can be applied.

The base material 305 is provided between the first circuit board 303 and the second circuit board 304, mainly for electric insulation and thermal dissipation, wherein the base material can be applied by resin, rubber or silicone, for instance FR-4.

In one embodiment, a through-hole 307 is defined in the corresponding position among the first circuit board 303, the second circuit board 304 and the base material 305. The through-hole 307 runs through the two circuit boards and the base material 305 to make an electric connection between the antenna assembly 301 and the sensing chip 306, wherein the sensing chip 306 is electrically connected with the sensor 302.

The sensor 302 is usually a near-field sensor which measures the distance between the human body and the terminal by an infrared ray, and it will experience a change in its capacitance when approached to or contacted by the human body. The sensing chip utilizes the change of the capacitance to decide whether the human body is approaching to or contacting the near-field sensor. The sensing chip 306 can set up a threshold value for the change of the capacitance, and when a capacitance change beyond the threshold value is detected, the sensing chip 306 sends a command signal to control the antenna assembly 301 to lower the input power; Besides being a near-field sensor, the sensor 302 can be any other sensing device or signal receiver which can detect the approach or the contact by the human body.

In order to further simplify the structure, only one near-field sensor is set near the spot where the antenna transmits signals, thus no more sensors are to be set on a comparatively large area which leads to a cost reducing.

As differs from the prior art, in one embodiment, the antenna assembly is applied on the first circuit board and the near-field sensor and the sensing chip are set on the second circuit board. The first circuit board and the second circuit board are separated by the base material, thus the problem of poor thermal dissipation performance when the antenna assembly and the sensor are integrated together is prevented. Further, the through-hole is defined through the base material and the circuit boards, which ensures a good point to point connection between the antenna assembly and the sensing chip. The near-field sensor is used to detect the approach or the contact by the human body and the sensing chip analyzes the result and controls the antenna assembly to lower the input power when the human body is approaching to or contacting the antenna assembly, thus reducing the radiation of the antenna to the human body and reducing the harm thereto.

Figure 4:
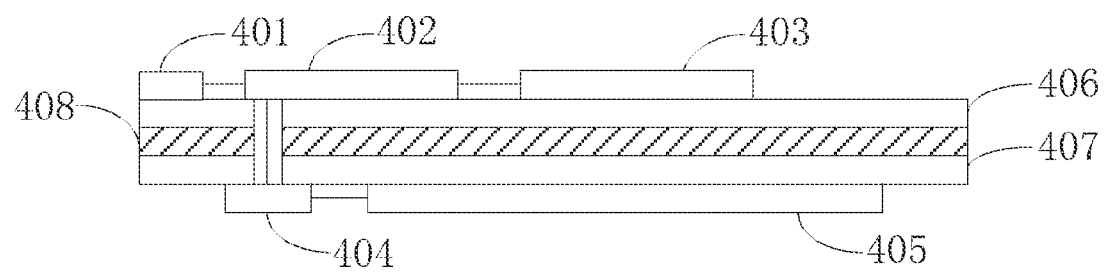
FIG. 4 is a schematic diagram of one embodiment of an apparatus for intelligently reducing a specific absorption rate.

FIG. 4 illustrates a schematic diagram of one embodiment of an apparatus for intelligently reducing a specific absorption rate. The apparatus comprises a signal generator circuit 401, a power amplifier 402, an antenna 403, a sensing chip 404 and a sensor 405. The signal generator circuit 401, the power amplifier 402 and the antenna 403 in series connect electrically with one another on the first circuit board 406, and the sensing chip 404 and the sensor 405 connect electrically on the second circuit board 407. The first circuit board 406 and the second circuit board 407 are separated by a base material 408. The power amplifier 402 and the sensing chip 404 connect electrically through the through-hole 307 defined in the first circuit board 406, the second circuit board 407 and the base material 408.

The signal generator circuit 401 is generally a modulation oscillating circuit for generating radio-frequency out-put signals.

The power amplifier 402 generally refers to RF Power Amplifier (RFPA), which is an integral part of general wireless transmitters. In the preceding stage circuit of the transmitter, the radio-frequency signal generated by the modulation oscillating circuit has a quite low power, therefore it needs a series of first buffer stage, middle amplifying stage and final power amplifying stage to gain sufficient radio-frequency power, only after that the radio-frequency signal can be fed to the antenna for transmitting.

More specifically, the power amplifier 402 is configured to output a first power signal when receiving an incoming sensing signal and output a second power signal when not receiving thereof, wherein the first power signal is lower than the second power signal; then the power amplifier 402 feeds the first power signal or the second power signal to the antenna 403, and the antenna 403 transmits out the first power signal and the second power signal.

As the radio-frequency power amplifier is based on the principle of multi-level amplification and the first power signal is lower than the second power signal, thus the first power signal is achieved as a result of the radio-frequency signal generated by the modulation oscillating circuit through relatively less amplifying stages, and the second power signal is achieved as a result of that through relatively more amplifying stages; of course, one more signal amplifier can be provided after the radio-frequency power amplifier to modulate the input signals.

Differing from the prior art, the power amplifier of one embodiment magnifies the incoming radio-frequency signal generated by the signal generator circuit based on multi-level amplifying principle with different levels, resulting in output signals with different power after the radio-frequency signal passes the power amplifier, thus the power amplifier is capable of amplifying the radio-frequency signal with different levels when receiving varying control commands from the sensing chip and output radio-frequency signals with different power accordingly. When the sensor detects that the human body is approaching to or contacting the antenna, the sensing chip controls the power amplifier to lower the power of the radio-frequency signal, thus reducing the radiation of the antenna to the human body and reducing the harm thereto.

Figure 5:
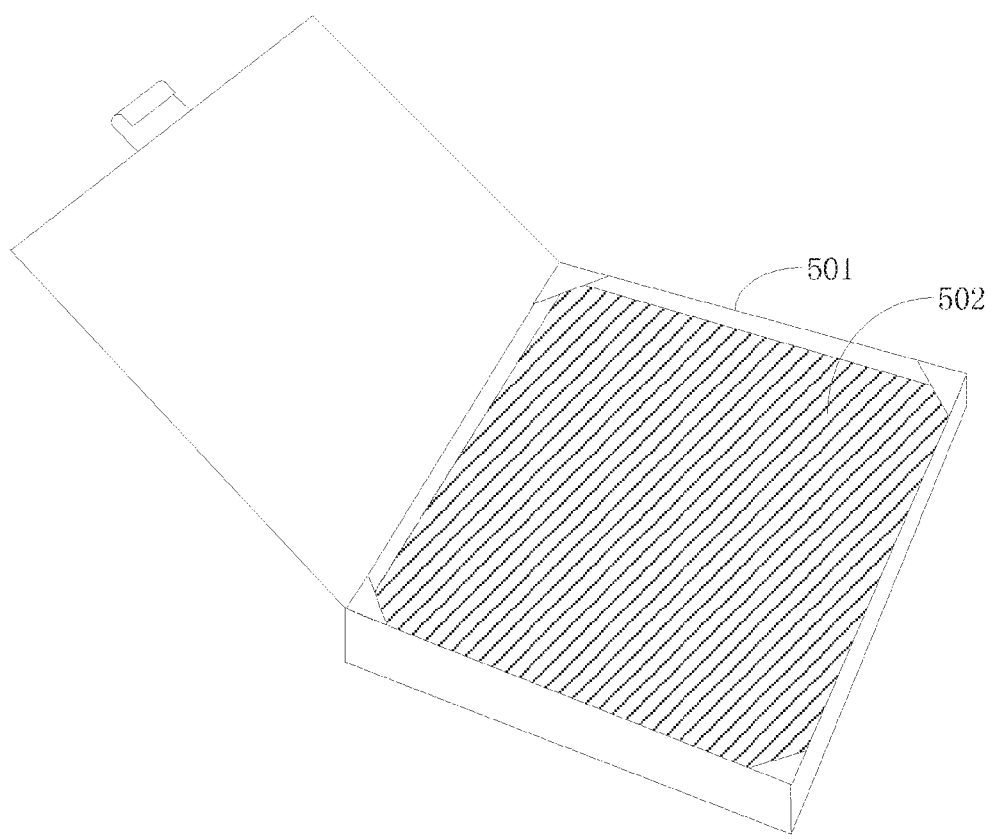
FIG. 5 is a schematic diagram of one embodiment of a protective case for intelligently reducing a specific absorption rate.

FIG. 5 illustrates a schematic diagram of one embodiment of a protective case for intelligently reducing a specific absorption rate. The protective case comprises a protective case 501 and an apparatus 502 set therein for intelligently reducing a specific absorption rate.

The apparatus 502 is the apparatus for intelligently reducing a specific absorption rate as any foregoing apparatus for intelligently reducing a specific absorption rate.

Figure 6:
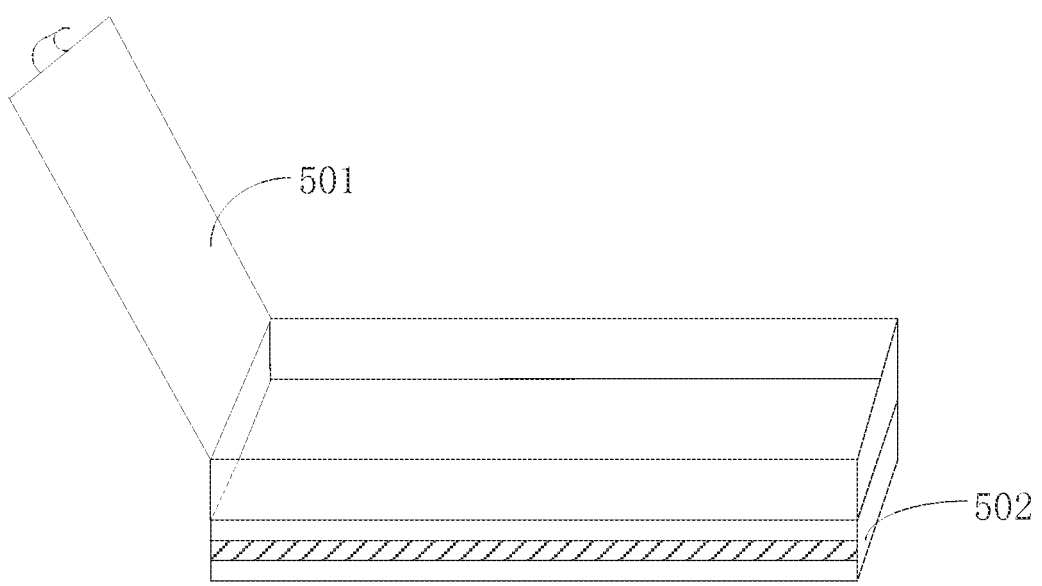
FIG. 6 is a cross sectional view of one embodiment of the protective case for intelligently reducing a specific absorption rate.

FIG. 6 illustrates a cross sectional view of the protective case for intelligently reducing a specific absorption rate. The apparatus 502 is located at the bottom of the internal space of the protective case 501. The upside of the internal space of the protective case 501 is spared for placing a mobile device. The apparatus 502 and the mobile device can be separated by a material, such as cloth, plastic or rubber with the same texture of the protective case 501, wherein the material is defined with a through-hole in order to facilitate the electric connection between the terminal and the apparatus 502.

Besides, if the antenna assembly of the apparatus 502 is an external antenna, a through-hole can also be defined in the corresponding position in the protective case 501 such that the external antenna can extend through for transmitting or receiving signals.

Differing from the prior art, the apparatus of one embodiment for intelligently reducing a specific absorption rate is located in the protective case of the mobile terminal, and detects whether the human body is approaching to or contacting the antenna while realizing the mobile network communication by the mobile terminal spontaneously, wherein the apparatus lowers the output power of the antenna when the human body is approaching to or contacting thereof, wherein the apparatus is set in the protective case for the mobile terminal, thus high-cost operations in the mobile terminal for a user can be prevented and at the same time it reduces the radiation of the antenna to the user and the harm thereto.

Figure 7:
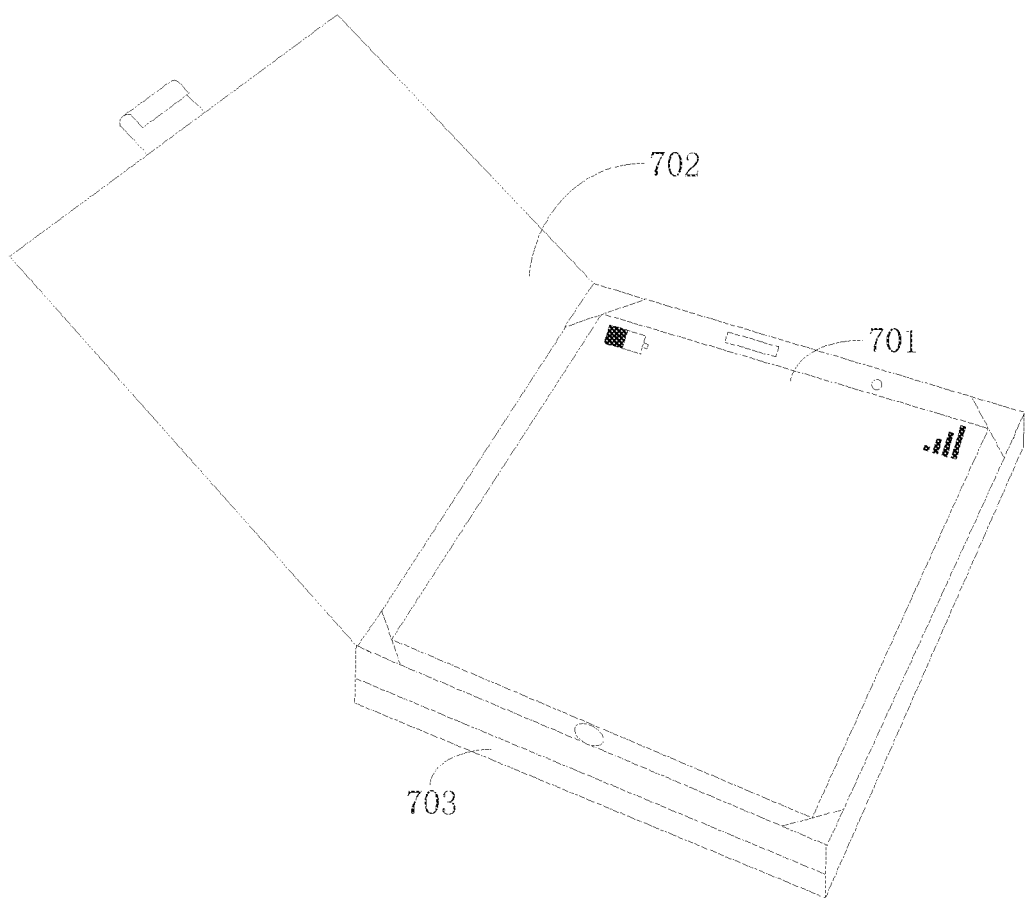
FIG. 7 is a schematic diagram of one embodiment of a terminal for intelligently reducing a specific absorption rate.

FIG. 7 illustrates a schematic diagram of one embodiment of a terminal for intelligently reducing a specific absorption rate. The terminal comprises a mobile terminal 701 and a protective case for intelligently reducing a specific absorption rate.

The protective case comprises a protective case 702 and an apparatus 703 for intelligently reducing a specific absorption rate located in the protective case 702.

The mobile terminal 701 can be generally a tablet, a cellphone or such a device, and it is in a wired or wireless connection with the apparatus 703 in the protective case 702. More specifically, the mobile terminal 701 is connected with the antenna assembly in the apparatus 703 to connect to a mobile network, thus further enabling the antenna assembly with mobile router functionality.

Differing from the prior art, the apparatus of one embodiment for intelligently reducing a specific absorption rate is located in the protective case of the mobile terminal, and can detect whether a human body is approaching to or contacting the antenna while realizing the mobile network communication by the mobile terminal spontaneously, wherein the apparatus can lower the output power of the antenna when the human body is approaching to or contacting thereof, wherein the apparatus is set in the protective case for the mobile terminal, thus high-cost operations in the mobile terminal for a user can be prevented and at the same time it reduces the radiation of the antenna to the user and the harm thereto.

It should be noted that above embodiments are merely exemplary ones of the present invention. Obviously, the present invention is not limited to above embodiments, but has many variations. All variations that a person skilled in the art derives from or directly reaches form the contents disclosed in the present invention shall be considered as falling into the protective scope of the present invention.

What is claimed is:

1. An apparatus for intelligently reducing a specific absorption rate, comprising:
    an antenna assembly;
    a sensing assembly being configured to detect an approach to or a contact of the antenna assembly by a human body;
    wherein the sensing assembly is also configured to control the antenna assembly for reduction of input power when detecting an approach to or a contact of the antenna assembly by a human body;
    wherein the antenna assembly is provided on a first circuit board, and the sensing assembly is provided on a second circuit board, and the antenna assembly is electrically connected to the sensing assembly;
    wherein the first circuit board is overlapped on the second circuit board and the first and second circuit boards are separated from each other by an electrically insulating base material.

2. The apparatus as claimed in claim 1, wherein the sensing assembly comprises:
    a sensor, which is configured to detect the approach to or the contact of the antenna assembly by the human body;
    a sensing chip being configured to judge whether the sensor detects the approach to or the contact of the antenna assembly by the human body, and to control the antenna assembly to lower the input power when the sensor detects the approach to or the contact of the antenna assembly by the human body.

3. The apparatus as claimed in claim 2, wherein a through-hole extends through the first circuit board, the second circuit board and the base material to make the electric connection between the antenna assembly and the sensing chip, wherein the sensing chip is electrically connected with the sensor.

4. The apparatus as claimed in claim 2, wherein the sensing chip utilizes a detection of a change of a capacitance in the sensor to judge whether the sensor detects the approach to or the contact of the antenna assembly by the human body.

5. The apparatus as claimed in claim 2, wherein the sensor is a near-field sensor to detect the approach to or the contact of the antenna by the human body.

6. The apparatus as claimed in claim 1, wherein the antenna assembly comprises:
   a signal generator circuit being configured to generate output signals;
   a power amplifier being configured to output signals with different power in accordance with the control of the sensing assembly
   an antenna being configured to transmit the output signals from the power amplifier.

7. The apparatus as claimed in claim 6, wherein the power amplifier is configured to output a first power signal when the approach to or the contact of the antenna assembly by the human body is detected and output a second power signal when that is not detected, wherein the first power signal is smaller than the second power signal in magnitude.

8. The apparatus as claimed in claim 1, wherein the antenna assembly is an in-built antenna in a mobile terminal.

9. The apparatus as claimed in claim 1, wherein the antenna assembly is a radio-frequency emitting device in a mobile terminal.

10. The apparatus as claimed in claim 1, wherein the antenna assembly is a wireless mobile router.

11. A protective case for intelligently reducing a specific absorption rate comprising:
   a protective case; and
   an apparatus being the apparatus as claimed in claim 1, the apparatus being received in the protective case.

12. The protective case as claimed in claim 11, wherein the apparatus is configured to connect to an external mobile terminal.

13. A terminal for intelligently reducing a specific absorption rate, comprising:
   a mobile terminal; and
   a protective case being the protective case as claimed in claim 11;
   wherein the mobile terminal is in a wired or wireless connection with the antenna assembly of the apparatus.

14. The apparatus as claimed in claim 6, wherein the signal generator circuit is a modulation oscillating circuit for generating radio-frequency output signals.

15. The apparatus as claimed in claim 6, further comprising one or more signal amplifiers provided after the power amplifier to modulate the input signals.

16. The apparatus of claim 1, wherein the base material is resin, rubber, or silicone.

17. The apparatus of claim 1, wherein the first circuit board contacts a first side of the base material and the second circuit board contacts a second side of the base material opposite the first side of the base material.

* * * * *